United States Patent [19]

Arakawa

[11] Patent Number: 5,310,274
[45] Date of Patent: May 10, 1994

[54] LOCK STRUCTURE FOR FLEXIBLE LINE

[75] Inventor: Makoto Arakawa, Tokyo, Japan

[73] Assignees: Kabushikigaisha Heisei, Tokyo; Hayashi Kabushikigaisha, Osaka, both of Japan

[21] Appl. No.: 966,010

[22] Filed: Oct. 23, 1992

[30] Foreign Application Priority Data

Dec. 13, 1991 [JP] Japan .................. 3-110029

[51] Int. Cl.$^5$ .................. F16B 11/00; A44B 17/00
[52] U.S. Cl. .................. 403/209; 403/208; 24/115 K
[58] Field of Search .............. 403/210, 212, 208, 206, 403/270, 209; 24/115 K, 114.5

[56] References Cited

U.S. PATENT DOCUMENTS

| | | | |
|---|---|---|---|
| 1,298,052 | 3/1919 | Kelly | 403/209 |
| 2,189,671 | 2/1940 | Mardis | 403/210 |
| 2,485,445 | 10/1949 | Hoffman | 403/210 |
| 3,009,224 | 11/1961 | Alexander | 403/208 |
| 5,173,997 | 12/1992 | Takezawa | 24/114.5 |

FOREIGN PATENT DOCUMENTS 2074207 10/1981 United Kingdom .............. 24/114.5

*Primary Examiner*—Paula A. Bradley
*Assistant Examiner*—Rex E. Pelto
*Attorney, Agent, or Firm*—Oblon, Spivak, McClelland, Maier & Neustadt

[57] ABSTRACT

A lock structure for a flexible line in which one looped end and a contiguous intermediate section of the line are fitted in approximately V-shaped grooves formed in a pair of approximately trapezoidal lock halves. The lock halves are of synthetic resin and have sharp pointed projections formed within the grooves for securing the line therein. The lock members are aligned with one another by an arrangement of engaging projections formed on a first one of the lock halves which engage with a corresponding arrangement of receiving holes formed in the second one of the lock halves. The lock halves are securely joined to one another by welding so that the flexible line can be firmly maintained in the welded lock structure for a prolonged period of time without loosening.

7 Claims, 2 Drawing Sheets

LOCK STRUCTURE FOR FLEXIBLE LINE

BACKGROUND OF THE INVENTION

1. Field of the Invention

The present invention relates to a lock structure for a long, flexible line such as a lead for a pet, a safety rope for a construction worker, an evacuation rope, a painter for mooring a ship, etc.

2. Discussion of Background

A rope, for example a dog lead in conventional use, is bent at one end into the form of a loop to be gripped by hand. The leading end of the dog lead is fastened to the side surface of an intermediate portion of the lead, and this portion is bound around with a strip of leather.

The conventional type of lead mentioned above, however, has the disadvantage that the lead is likely to get soft and broken at the leather after repeated use, with the result that the looped end of the lead will become detached from the intermediate portion. The lead, therefore, cannot withstand long-time use.

SUMMARY OF THE INVENTION

Accordingly, one object of the present invention is to provide a durable lock structure for a flexible line.

In order to accomplish the object stated above, the lock structure of the present invention is provided with approximately V-shaped grooves of an identical form which open at both ends, in flat surfaces of a pair of synthetic-resin mating lock members of a flat approximately trapezoidal form. Within the grooves are formed a plurality of sharp-pointed projections, and in the flat surfaces of these mating lock members are formed holes for receiving a plurality of projections therein. One end of the line and an intermediate portion of the line contiguous with the end are pressed into the grooves until the projections pierce the line, and then both of the lock members are fixedly attached by ultrasonic welding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
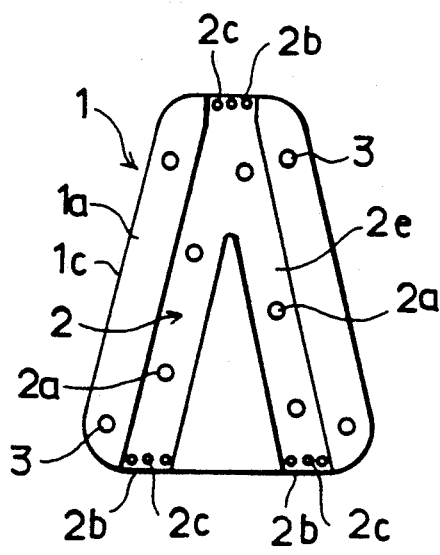
FIGS. 1(a) and 1(b) show a plan view of an embodiment of the present invention.
Figure 1B:
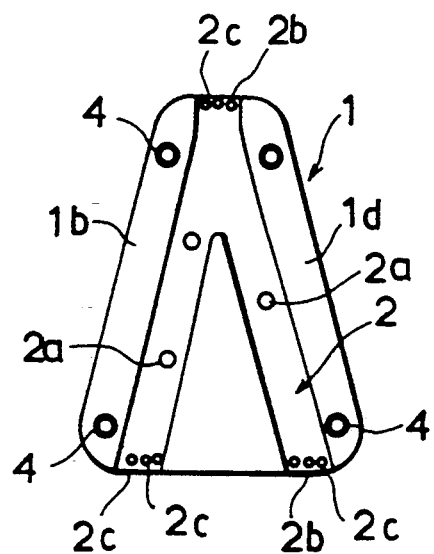
Figure 2A:
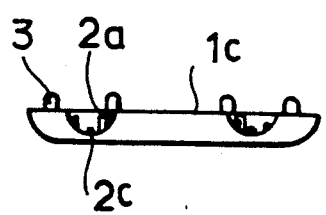
FIGS. 2(a) and 2(b) show a front view of the same embodiment of the present invention.
Figure 2B:
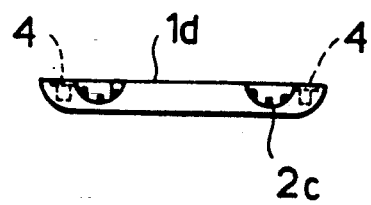
Figure 3:
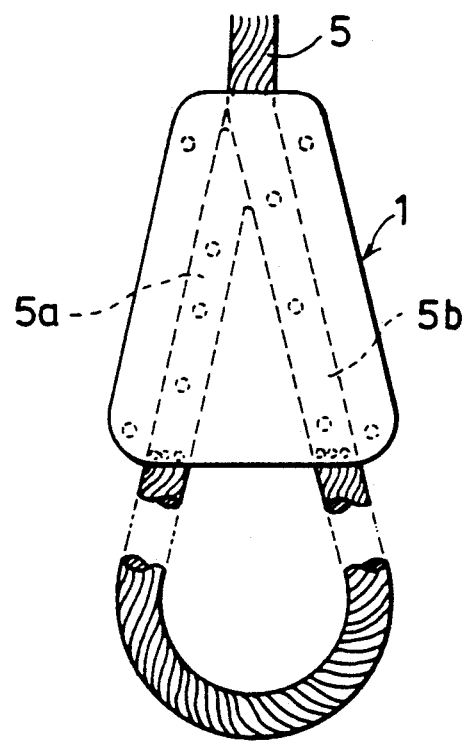
FIG. 3 is a plan view showing the locking condition of the present invention.

Referring now to the drawings, wherein like reference numerals designate identical or corresponding parts throughout the several views, the present invention will be described with reference to FIGS. 1 to 3.

A reference numeral 1 refers to a lock member, which is produced of a synthetic-resin material. The lock member 1 comprises first and second flat approximately trapezoidal lock halves 1a and 1b, each half having approximately V-shaped grooves 2, 2 in top plan of an identical shape formed in mating flat sections 1c and 1d, open at both ends. Within the central portion of the grooves 2 are provided a plurality of sharp-pointed projections 2a, 2a. At the edges 2b, 2b of the grooves 2, 2 are provided small projections 2c, 2c.

There are formed locking or engaging projections 3, 3 on the flat section 1c of first lock half 1a. Receiving holes 4, 4 are formed in the flat section 1d of second lock half 1b at positions corresponding to the location of locking projections 3, 3 on first lock half 1a.

A numeral 5 is for example a long, flexible line produced of nylon. Numeral 5a denotes an end portion, and numeral 5b represents a continuous intermediate section.

Next, a method for locking the long, flexible line having the above-described parts will be explained.

The long, flexible line 5 is bent into a loop with its end portion 5a and the intermediate section 5b interposed within groove 2 of first lock half 1a, and then second lock half 1b is placed on the first lock half 1a with the projections 3, 3 fitted in the receiving holes 4, 4. Subsequently, these lock halves 1a and 1b and the flat sections 1c and 1d are fixedly attached by an ultrasonic welder.

Thence the projections 2a, 2a pierce through the long, flexible line 5 and at the same time the small projections 2c, 2c bite into the line 5, thereby surrounding and securing the one end portion 5a and intermediate portion 5b of the line 5.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A lock structure for a flexible line, comprising:
   a first trapezoidal lock half having a flat surface with a first V-shaped groove, as viewed in top plan, formed therein;
   a second trapezoidal lock half having a flat surface with a second V-shaped groove, as viewed in top plan, formed therein, said second V-shaped groove being identical to said first V-shaped groove for fitting-opposite said first V-shaped groove and for positioning of said line therebetween;
   a plurality of sharp-pointed projections formed in each of said first and second V-shaped grooves for penetrating and securing said flexible line within said grooves;
   a plurality of engaging projections formed on said flat surface of said first lock half;
   a plurality of receiving holes formed in said second lock half arranged so as to receive said engaging projections therein and to align said first and second lock halves with said flat surfaces in contact with one another and with said first and second grooves aligned opposite one another.

2. A lock structure as recited in claim 1, wherein a plurality of additional projections, smaller in size than said sharp-pointed projections, are formed within each of said grooves at edge openings thereof.

3. The lock structure according to claim 2, wherein said additional projections are identically formed in each groove so as to be aligned in direct opposition to one another when said lock halves are assembled with said flat surfaces in contact with one another.

4. The lock structure according to claim 1, wherein a flexible cable is received in said first and second grooves and secured by said projections, and wherein said first and second lock halves are secured to each other by ultrasonic welding.

5. The lock structure according to claim 1, wherein said first and second grooves are semi-circular in cross-section.

6. The lock structure according to claim 1, wherein said sharp-pointed projections in said second groove are staggered so as not to directly oppose the sharp-pointed projections in said first groove when said first and second lock halves are assembled with said flat surfaces in contact with one another.

7. A lock structure according to claim 1, wherein said first and second lock members are made of synthetic resin.

* * * * *